3,383,409
β-(2,6-DIHALOPHENYL)ETHYLAMINO GUANI-
DINES AND THE SALTS THEREOF
John Bernard Bream, Redbourn, Claude Wolfgang Picard,
Welwyn Garden City, and Trevor George White, King's
Langley, England, assignors to Dr. A. Wander S.A.,
Bern, Switzerland, a corporation of Switzerland
No Drawing. Continuation-in-part of application Ser. No.
453,172, May 4, 1965. This application Nov. 10, 1966,
Ser. No. 593,311
3 Claims. (Cl. 260—501.14)

ABSTRACT OF THE DISCLOSURE 2,6 - dihalogenated phenyl ethylaminoguanidine compounds which exhibit anti-hypertensive pharmacological properties without causing a large increase in the blood pressure or in the pulse rate for prolonged periods after administration and which have the following formula:

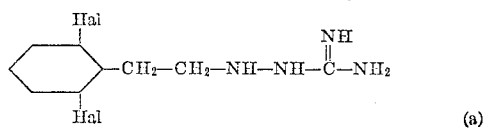

(a)

wherein Hal stands for halogen; and (b) the pharmaceutically acceptable acid addition salts of (a).

---

This application is a continuation-in-part application of our copending U.S. patent application Ser. No. 453,172 filed May 4, 1965 and now abandoned.

It has been found that some new phenylalkylaminoguanidines have hypotensive activity and are superior in this regard to known componnds having this action. They are compounds having the general formula:

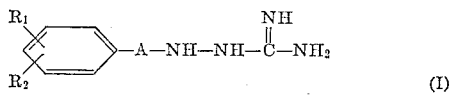

(I)

as well as acid addition salts thereof. In Formula I, a denotes a straight alkylene group with 2 or 3 carbon atoms. $R_1$ and $R_2$, which may be the same or different, represent hydrogen, halogen, methyl, ethyl, methoxy, or ethoxy.

Specific preferred compounds according to the invention are β-phenethylaminoguanidine, γ-phenylpropylaminoguanidine, β-(o-fluorophenyl)ethylaminoguanidine, β-(2,6-dichlorophenyl)ethylaminoguanidine and acid addition salts thereof.

The hypotensive action of phenylalkylaminoguanidines of Formula I and their acid addition salts is based on their sympatholytic activity. Pharmacologically this can be seen in a diminution of the nictitating membrane contraction on pre- and postganglionic stimulation of the cervical sympathetic nerve of the cat or the guinea-pig. This effect is produced, at a comparable or lower level of attendant toxicity by smaller amounts of the compounds according to the invention than of known hypotensive agents.

Moreover, some of the compounds according to the invention, especially the 2,6 - dihalogenated phenylalkylaminoguanidines, are substantially free from certain undesirable side-effects which are usually observed on previously known hypotensive agents. These side-effects, consisting in a rise in blood pressure of a shorter or longer duration and an acceleration of the pulse just after administration of the drug and before the onset of the desired fall in blood pressure, are opposite to the intended effect, and require certain preventive measures. So, previously known hypotensive agents must be used with great caution and initially in gradually increasing doses until the desired response is obtained.

The compounds of Formula I above and their acid addition salts may be obtained by hydrogenating phenylalkylideneaminoguanidines or phenylalkenylideneaminoguanidines of the formula:

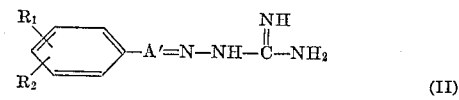

(II)

or acid addition salts thereof, in which A' represents the alkylylidene or alkenylylidene group corresponding to the alkylene group A, and $R_1$ and $R_2$ have the meaning given above. The hydrogenation may with advantage be carried out catalytically with hydrogen. The basic starting material (II) or its acid addition salts, respectively, may be obtained, for example, by reacting a carbonyl compound of the formula:

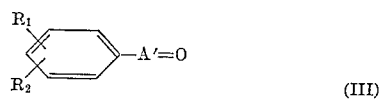

(III)

in which A', $R_1$ and $R_2$ have the meaning given above, with aminoguanidine or an acid addition salt thereof.

The phenylalkylaminoguanidines of Formula I and their acid addition salts may also be produced by reacting phenylalkylhydrazines of the formula:

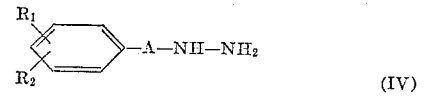

(IV)

in which A, $R_1$ and $R_2$ have the meaning given above, with a compound of the formula:

(V)

in which Z represents a cleavable radical, especially an alkoxy or alkylthio group or an 1-azolyl group, e.g. a 1-pyrazolyl or 1-(3,5-dimethyl)pyrazolyl group, or an acid addition salt thereof. A preferred method consists in reacting the phenylalkylhydrazines of Formula IV with S-methylisothiourea or an acid addition salt thereof, such as S-methylisothiouronium sulphate or S-methylisothiouronium nitrate. If a S-alkylisothiouronium sulphate is used as starting material, the reaction product is preferably not isolated in the form of the sulphate, but transformed into the nitrate, for instance by addition of barium nitrate; by proceeding in this way, a purer product can be obtained.

The compounds of the general Formula I and their acid addition salts may also be obtained by reacting phenylalkylhydrazines of the Formula IV, or acid addition salts thereof, with cyanamide.

The phenylalkylhydrazines (IV) used as starting materials may be obtained, for example, by reacting the corresponding phenylalkyl chlorides with hydrazine.

Insofar as there are obtained free bases by using the procedures described above, they can be subsequently converted, if desired, into their acid addition salts. On the other hand, the bases can be liberated from the acid addition salts obtained by the procedures described above.

The acid addition salts of phenylalkylaminoguanidines of Formula I include those with the usual inorganic and organic acids, e.g. with carbonic acid, hydrochloric acid, hydrobromic acid, sulphuric acid, nitric acid, phosphoric acid, acetic acid, maleic acid, oxalic acid, tartaric acid, toluenesulphonic acid and similar acids.

Example 1

85 gm. (0.625 mole) of aminoguanidine dihydrogen carbonate were suspended in 1200 ml. of water, and the suspension was treated with dilute (1:1) nitric acid, while stirring, until the pH was 3. The mixture was then treated with 300 ml. of ethanol, and the solution obtained was heated at reflux. The hot solution was stirred and at the same time 81 gm. (0.625 mole) of phenylacetaldehyde in 1000 ml. of ethanol were added during 1¼ hours. The reaction mixture was heated for another 2 hours at reflux while stirring. The reaction mixture was then concentrated in vacuo to a volume of about 1000 ml. Whitish crystals of a rhombic shape separated out on cooling. After recrystallization from ethanol/diisopropyl ether and treatment with charcoal, β-phenethylideneaminoguanidine hydrogen nitrate of melting point 156–157° C. was obtained in a yield of 90% of the theoretical.

11 gm. (0.046 mole) of this salt were dissolved in 90% aqueous acetic acid and hydrogenated with 0.25 gm. of Adams' catalyst at room temperature and normal pressure. When the theoretical amount of hydrogen gas had been absorbed, the catalyst was removed by filtration. The filtrate was heated on a water bath and then treated with diisopropyl ether. 9.8 gm. (89% of the theory) of β-phenethylaminoguanidine hydrogen nitrate, which melted at 145° C. after recrystallization from ethanol/diisopropyl ether, were obtained on cooling.

The semi-dihydrogen oxalate of the same base showed a melting point (from aqueous ethanol) of 213–214° C. (with decomposition); the hydrochloride showed a melting point (from n-propanol/diisopropyl ether) of 114–121° C.; the semi-dihydrogen carbonate melted (after washing with ethanol/diisopropyl ether) at 109–111° C. (with decomposition); and the hydrobromide showed a melting point (from n-propanol/diisopropyl ether) of 119–120° C.

Example 2

A mixture consisting of 17.4 gm. (0.105 mole) of β-(o-methoxyphenyl)ethylhydrazine and 13.9 gm. (0.05 mole) of S-methylisothiouronium sulphate in 25 ml. of water was heated on a steam bath until the evolution of methanethiol ceased. The hot solution was treated with a hot solution of 13.1 gm. (0.05 mole) of barium nitrate in 150 ml. of water and the precipitated barium sulphate was separated by filtration. The filtrate was concentrated in vacuo. On cooling 10.3 gm. (39% of the theoretical yield) of β-(o-methoxyphenyl)ethylaminoguanidine hydrogen nitrate were obtained in the form of an off-white powder. Upon recrystallization from water the product showed a melting point of 129–132° C.

Example 3

A solution comprising 20.7 gm. (0.1 mole) of β-(p-chlorophenyl)ethylhydrazine hydrochloride and 17.9 gm. (0.425 mole) of cyanamide in 100 ml. of water was heated on a steam bath during 8 hours. The reaction product was precipitated by adding a solution of 9.3 gm. (0.11 mole) of sodium bicarbonate in 200 ml. of water. The bicarbonate obtained was suspended in 100 ml. of n-propanol and treated, while swirling, with a solution of 1.65 gm. (0.03 mole) of sulphuric acid in 25 ml. of n-propanol. After the evolution of carbon dioxide had ceased, the solution was treated with charcoal and filtered. On cooling 2.5 gm. of β-(p-chlorophenyl)ethylaminoguanidine semi-dihydrogen sulphate in the form of white plates were obtained. By concentration of the mother liquors, further 7.1 gm. of this product could be isolated, thus giving a total yield of 9.6 gm. (37% of the theoretical). When recrystallized from aqueous ethanol, the product showed a melting point of 192–195° C.

A sample of the product was extracted with chloroform from an alkaline aqueous solution. The solvent was evaporated, and the residue was taken in a small amount of water. Upon addition of nitric acid, the corresponding hydrogen nitrate was obtained, which, after recrystallization from ethanol, showed a melting point of 146–147° C. (with decomposition).

Example 4

A solution of 34.25 gm. (0.25 mole) of aminoguanidine hydrogen nitrate in 250 ml. of 93% ethanol and 50 ml. of water was heated to reflux and treated dropwise with a solution of 37.4 gm. (0.275 mole) of cinnamaldehyde in 150 ml. of 93% ethanol over 30 minutes. The solution was then refluxed for a further 3 hours. The solution was concentrated in a rotary film evaporator, and on cooling gave 51.8 gm. of cinnamaldehyde guanylhydrazone hydrogen nitrate in the form of pale yellow needles of melting point 194–195° C. (with decomposition) in a yield of 83% of the theoretical.

A suspension of 39 gm. (0.155 mole) of this product in 1000 ml. of absolute ethanol was hydrogenated at 45° C. in the presence of 0.5 gm. of Adams' catalyst until the uptake of hydrogen had ceased. The catalyst was filtered off, and the solution was evaporated to dryness in a rotary film evaporator. There are obtained 38.2 gm. of γ-phenylpropylaminoguanidine hydrogen nitrate in the form of a white powder of melting point 72–76° C. in a yield of 98% of the theoretical. Recrystallization from ethanol/diisopropyl ether gave clusters of white plates of constant melting point 81–84° C.

Example 5

A solution of 96 gm. (0.322 mole) of sodium dichromate and 76 ml. (1.38 mole) of concentrated sulphuric acid in 400 ml. of water at 25° C. was covered with a layer of 900 ml. of toluene and treated with a solution of 123 gm. (0.82 mole) of γ-o-tolylpropanol in 200 ml. of toluene with vigorous stirring. The temperature of the mixture rose to 56° C. After allowing the mixture to cool to room temperature, the toluene layer was separated, combined with 3 x 250 ml. of ether extracts, dried and distilled, to give β-o-tolylpropionaldehyde in the form of a straw-coloured oil of boiling range 117–138° C./13 mm. Hg.

A refluxing solution of 32.9 gm. (0.24 mole) of aminoguanidine hydrogen nitrate in 50 ml. of water and 250 ml. of 95% ethanol was treated with a solution of 37 gm. (0.25 mole) of β-o-tolylpropionaldehyde, added over 45 minutes. After refluxing for a further 2 hours, the solvents were removed in a rotary film evaporator, and the residual white solid was triturated with ether to give 54.7 gm. of γ-o-tolylpropylideneaminoguanidine hydrogen nitrate in the form of an amorphous powder of melting point 150–158° C. in a yield of 86% of the theoretical. Two recrystallizations of a sample from water/isopropanol gave white needles of constant melting point 169–171° C. (with decomposition).

A suspension of 21.1 gm. (0.079 mole) of γ-o-tolylpropylideneaminoguanidine hydrogen nitrate in 500 ml. of absolute ethanol was hydrogenated in the presence of 0.5 gm. of Adams' catalyst until the uptake of hydrogen ceased. After filtering off the catalyst, the filtrate was concentrated in a rotary film evaporator and gave 15.3 gm. of γ-o-tolylpropylaminoguanidine hydrogen nitrate in the form of a white solid, which was suspended in diisopropyl ether, filtered and dried. This white precipitate had melting point 121–125° C. Another 1.1 gm. of this product was obtained from the filtrate on standing, thus giving a total yield of 16.4 gm. (77% of the theoretical). Two recrystallizations of the main crop from isopropanol, with a carbon treatment, gave white plates of constant melting point of 126–129° C.

Example 6

By brominating 2,6-dichlorotoluene under the action of light, reacting the resulting 2,6-dichlorobenzyl bromide with potassium cyanide, saponifying the resulting 2,6-dichlorobenzyl cyanide to 2,6-dichlorophenylacetic acid, reducing the latter with lithium-aluminum hydride, treating the resulting β-(2,6-dichlorophenyl)ethanol with thionyl chloride and reacting the resulting β-(2,6-dichlorophenyl)ethyl chloride with hydrazine hydrate, there was obtained β-(2,6-dichlorophenyl)ethylhydrazine with a boiling point of 144–148° C./8 mm. Hg.

A mixture of 11.3 gm. (0.055 mole) of this hydrazine and 5.85 gm. (0.021 mole) of S-methylisothiouronium sulphate in 100 ml. of water was heated on a steam bath until the evolution of methanethiol ceased. The hot solution was treated with a hot solution of 5.55 gm. (0.021 mole) of barium nitrate in 100 ml. of water and the precipitated barium sulphate was separated by filtration. On cooling the filtrate, 5 gm. of β-(2,6-dichlorophenyl)ethylaminoguanidine hydrogen nitrate were obtained in the form of white needles. After recrystallization from water the product showed a melting point of 189–190° C.

Example 7

2,6-dichlorophenylacetaldehyde, obtained by oxidizing β-(2,6-dichlorophenyl)ethanol with sodium dichromate in sulphuric acid, was reacted in ethanolic solution with aminoguanidine hydrogen nitrate, thus obtaining β-(2,6-dichlorophenyl)ethylideneaminoguanidine hydrogen nitrate with a melting point of 226–228° C.

A suspension of 31.5 gm. (0.102 mole) of this salt in 1000 ml. of absolute ethanol was heated to 45° C. and shaken under a hydrogen atmosphere with 1 gm. of Adams' catalyst. During hydrogenation two further 0.5-gm. portions of the catalyst were added. After absorption of the theoretical quantity of hydrogen (2300 ml.) the catalyst was removed by filtration. The filtrate was concentrated in vacuo, whereupon 13 gm. (49% of theory) of a white, granular solid were obtained. The β-(2,6-dichlorophenyl)ethylaminoguanidine hydrogen nitrate after being recrystallized twice from n-propanol/water, consisted of fine white needles which melted at 190–192° C. On the basis of the mixed melting point the product was found to be identical with the compound obtained according to Example 6.

Example 8

2,6-dichlorophenylacetaldehyde, obtained by oxidizing β-(2,6-dichlorophenyl)ethanol with sodium dichromate in sulphuric acid, was reacted in ethanolic solution with aminoguanidine hydrochloride, thus obtaining β-(2,6-dichlorophenyl)ethylideneaminoguanidine hydrochloride with a melting point of 170–173° C.

A suspension of 77.8 gm. (0.276 mole) of this salt in 500 ml. of absolute ethanol and 70 ml. of 16% ethanolic hydrochloric acid was heated to 45° C. and shaken under a hydrogen atmosphere with 1 gm. of Adams' catalyst. After absorption of the theoretical quantity of hydrogen (6200 ml.) the catalyst was removed by filtration. The filtrate was concentrated in vacuo and the residue obtained was 3 times crystallized from isopropanol, whereby 70.2 gm. (90% of theory) of β-(2,6-dichlorophenyl)ethylaminoguanidine hydrochloride in the form of white needles of melting point 189–191° C. were obtained. The base, liberated from this hydrochloride showed, after crystallization from ethanol, the melting point of 158–160° C.

The semi-dihydrogen carbonate of this base melted at 158–161° C. (after washing with water); the dihydrogen tartrate at 167–169° C. (after crystallization from isopropanol/ether) and the dihydrogen maleate at 153–157° C. (after crystallization from isopropanol/ether).

Example 9

A solution of 24.0 gm. (0.1 mole) of β-(2,6-dichlorophenyl)ethylhydrazine hydrochloride and 17.9 gm. (0.425 mole) of cyanamide in 100 ml. of water was heated for 8 hours on a steam bath. The reaction product was precipitated by adding a solution of 9.3 gm. (0.11 mole) of sodium bicarbonate in 200 ml. of water. The bicarbonate obtained was suspended in 100 ml. of n-propanol and treated, while swirling, with a solution of 1.65 ml. (0.03 mole) of sulphuric acid in 25 ml. of n-propanol. When the evolution of carbon dioxide had ceased, the solution was treated with charcoal and filtered. From the filtrate 10.1 gm. of crude β-(2,6-dichlorophenyl)ethylaminoguanidine semi-dihydrogen sulphate could be isolated which, after recrystallization from ethanol/water, melted at 212–217° C.

By taking up this product from alkaline aqueous solution with chloroform, evaporating it, taking up the residue with a little water and adding a small quantity of concentrated nitric acid the corresponding pure hydrogen nitrate of melting point 190–192° C. was obtained, which was identical with the product obtained according to Examples 6 and 7.

Example 10

γ-(2,6-dichlorophenyl)propanol, obtained by subjecting 2,6-dichlorobenzyl bromide to a Grignard reaction with magnesium and ethylene oxide, was oxidized with sodium dichromate in sulphuric acid to γ-(2,6-dichlorophenyl)propionaldehyde. This latter was converted by reacting with aminoguanidine hydrogen nitrate into γ-(2,6-dichlorophenyl)propylideneaminoguanidine hydrogen nitrate, which after recrystallization from aqueous ethanol formed white prisms which melted at 224° C.

12.9 gm. (0.04 mole) of this salt were hydrogenated as described in Example 2 in 500 ml. of absolute ethanol in the presence of 0.5 gm. of Adams' catalyst. After removing the catalyst by filtration the reaction mixture was concentrated in vacuo and diluted with diisopropyl ether, whereby 9.8 gm. (76% of theory) of γ-2,6-dichlorophenyl)propylaminoguanidine hydrogen nitrate were obtained. Recrystallization from water/isopropanol gave white platelets with a melting point of 164–165° C.

By the same procedure as in Examples 1 to 10 there are also obtained, for example, the products mentioned in the following Table I. In the table I–A, $R_1$ and $R_2$ correspond to the groups in Formula I, with the meaning stated earlier. In the column on the right are given in brackets the solvents or solvent mixtures from which crystallization was effected; here el, means ethanol, d, diisopropyl ether, i, isopropanol, m, methanol, p, n-propanol, and w, water.

| Example | A | $R_1$ | $R_2$ | Form | Melting point |
|---|---|---|---|---|---|
| 11 | —(CH$_2$)$_2$— | m-CH$_3$ | H | Semi-dihydrogen sulfate / Hydrogen nitrate | 171–174° C. decomposition (el/d). / 96–98° C. (p/w). |
| 12 | —(CH$_2$)$_2$— | p-CH$_3$ | H | Semi-dihydrogen sulphate / Hydrogen nitrate | 178–184 ° C. (el). / 118–119 ° C. (w). |
| 13 | —(CH$_2$)$_2$— | o-CH$_3$ | H | Semi-dihydrogen sulphate / Hydrogen nitrate | 171–176 ° C. decomposition (el/i). / 150–151 ° C. (w/i). |
| 14 | —(CH$_2$)$_2$— | p-F | H | Semi-dihyrdogen sulphate / Hydrogen nitrate | 152–155 ° C. (el/d). / 123–124° C. (w). |
| (5 | —(CH$_2$)$_2$— | o-F | H | Semi-dihydrogen sulphate / Hydrogen nitrate | 170–173 ° C. (el/w). / 133–134 ° C. (w). |
| 16 | —(CH$_2$)$_2$— | p-OCH$_3$ | H | Eemi-dihydrogen sulphate / Hydrogen nitrate | 207–215 ° C. decomposition (el/w). / 116–118 ° C. (el). |
| 17 | —(CH$_2$)$_2$— | p-Br | H | Hydrogen nitrate | 160–162 ° C. (w). |
| 18 | —(CH$_2$)C— | m-Cl | H | do | 117–120° C. (w). |
| 19 | —(CH$_2$)$_2$— | o-Cl | H | do | 158–160° C. (w). |
| 20 | —(CH$_2$)$_2$— | o-Br | H | do | 158–162° C. (w). |
| 21 | —(CH$_2$)$_2$— | 3-Cl | 4-Cl | Semi-dihydrogen sulphate | 230° C. (m/d). |
| 22 | —(CH$_2$)$_2$— | 2-Cl | 4-Cl | Hydrogen nitrate | 161–163° C. (p). |
| 23 | —(CH$_2$)$_3$— | o-F | H | do | 78° C. (i/d). |
| 24 | —(CH$_2$)$_3$— | p-F | H | do | 89–92° C. (p/d). |
| 25 | —(CH$_2$)$_3$— | o-Cl | H | do | 127–° C. (el/d). |
| 26 | —(CH$_2$)$_3$— | p-Cl | H | do | 126–129° C. (w). |
| 27 | —(CH$_2$)$_3$— | p-CH$_3$ | H | do | 105–107° C. (i/d). |
| 28 | —(CH$_2$)$_3$— | 2-Cl | 4-Cl | do | 124–126° C. (w). |
| 29 | —(CH$_2$)$_3$— | 3-Cl | 4-Cl | do | 140–142° C. (w/i). |

Production of tablets.—For the manufacture of tablets, the products of this invention can be mixed with mannitol and granulated with water, 0.5% sodium alginate or 1% gelatine solution. The dried granulate is compressed into tablets in the presence of about 5% of talcum, 5% of corn starch and 0.1% of magnesium stearate. In this way, there are obtained, e.g. tablets of the following compositions:

|  | Mg. |
|---|---|
| (a) β-(2,6-dichlorophenyl)ethylaminoguanidine hydrochloride | 5 |
| Mannitol | 90 |
| Corn starch | 5 |
| Talcum | 2 |
| Magnesium stearate | 0.1 |
| (b) β-(2,6-dichlorophenyl)ethylaminoguanidine hydrochloride | 20 |
| Mannitol | 75 |
| Corn starch | 5 |
| Talcum | 2 |
| Magnesium stearate | 0.1 |

These 102 mg. tablets can be orally administered in the treatment of hypertension in general and especially in the case of essential and renal hypertension. The daily dosage amounts from 2 to 8 tablets of (a) (containing 5 mg. of active ingredient) or 1 or 2 tablets of (b) (containing 20 mg. of active ingredient).

We claim:
1. A compound selected from the class consisting of (a) 2,6-dihalogenophenylalkylaminoguanidines of the formula:

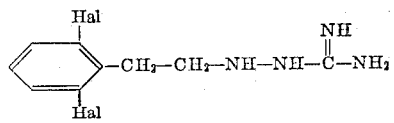

wherein Hal stands for halogen; and (b) pharmaceutically acceptable acid addition salts of (a).

2. β-(2,6-dichlorophenyl)ethylaminoguanidine and its acid addition salts.

3. β-(2,6-dichlorophenyl)ethylaminoguanidine hydrochloride.

References Cited

UNITED STATES PATENTS 3,271,448  9/1966  Augstein et al. _____ 260—564

OTHER REFERENCES

Robertson et al., "Jour. Med. Chem.," vol. 6, No. 4, pp. 381–4 (1963) RS1J5.

CHARLES B. PARKER, *Primary Examiner.*

R. V. HINES, *Assistant Examiner.*

UNITED STATES PATENT OFFICE
CERTIFICATE OF CORRECTION

Patent No. 3,383,409                            May 14, 1968

John Bernard Bream et al.

It is certified that error appears in the above identified patent and that said Letters Patent are hereby corrected as shown below:

Column 1, line 15, "2.6" should read -- 2,6 --; same column 1, lines 20 to 25, the left-hand portion of the formula should appear as shown below:

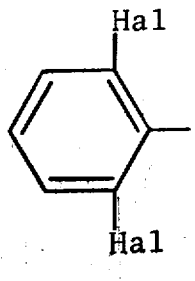

Column 3, lines 7 and 40, and column 5, lines 25 and 47, and column 6, line 43, "in vacuo", each occurrence, should read -- in vacuo --, in italics; same column 3, line 9, "etthanol/diisopropyl" should read -- ethanol/diisopropyl --. Column 6, line 44, "γ-2,6-dichlorophen-" should read -- γ-(2,6-dichlorophene- --; line 50, "table I-A," should read -- Table I-A, --; after line 56, insert -- Table I --. Columns 5 and 6, Table I, first column, line 5 thereof, "(5" should read -- 15 --; same Table I, under column "A", line 8 thereof, "-(CH$_2$)C-" should read -- -(CH$_2$)$_2$- --; same Table I, under same column "A", line 9 thereof, "-(CH$_2$(2-" should read -- -(CH$_2$)$_2$- --; same Table I, under column "R$_1$", line 1 thereof, "L m-CH$_3$" should read -- m-CH$_3$ --; same Table I, under column "Form", line 11 thereof, "Eemi-dihydrogen" should read -- Semi-dihydrogen --. Column 7, line 24, after "of" insert -- patients suffering from --.

Signed and sealed this 16th day of December 1969.

(SEAL)
Attest:

EDWARD M. FLETCHER, JR.                    WILLIAM E. SCHUYLER, JR.
Attesting Officer                             Commissioner of Patents